United States Patent
Tomomasa

(10) Patent No.: US 10,557,518 B2
(45) Date of Patent: Feb. 11, 2020

(54) VIBRATION ISOLATION DEVICE

(71) Applicant: Sharp Kabushiki Kaisha, Sakai, Osaka (JP)

(72) Inventor: Masatoshi Tomomasa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/066,318

(22) PCT Filed: Dec. 21, 2016

(86) PCT No.: PCT/JP2016/088177
§ 371 (c)(1),
(2) Date: Jun. 27, 2018

(87) PCT Pub. No.: WO2017/119302
PCT Pub. Date: Jul. 13, 2017

(65) Prior Publication Data
US 2019/0017570 A1     Jan. 17, 2019

(30) Foreign Application Priority Data

Jan. 4, 2016 (JP) ................................. 2016-000085
Nov. 30, 2016 (JP) ................................. 2016-233017

(51) Int. Cl.
*F16F 15/08* (2006.01)
*G03B 17/56* (2006.01)

(52) U.S. Cl.
CPC ............ *F16F 15/08* (2013.01); *G03B 17/561* (2013.01)

(58) Field of Classification Search
None
See application file for complete search history.

(56) References Cited

U.S. PATENT DOCUMENTS

2012/0316685 A1* 12/2012 Pettersson ................. F16F 3/00
                                                   700/275
2018/0128338 A1*  5/2018 Tian ......................... F16F 15/08
2019/0017570 A1*  1/2019 Tomomasa .............. F16F 15/08

FOREIGN PATENT DOCUMENTS

| JP | 7-187349 A   | 7/1995  |
| JP | 11-182623 A  | 7/1999  |
| JP | 2001-298065 A | 10/2001 |
| JP | 2015-225260 A | 12/2015 |

OTHER PUBLICATIONS

Official Communication issued in International Patent Application No. PCT/JP2016/088177, dated Jan. 31, 2017.

\* cited by examiner

*Primary Examiner* — William B Perkey
(74) *Attorney, Agent, or Firm* — Keating & Bennett, LLP

(57) ABSTRACT

[Object] To bring about great vibration isolating effects through a combination of isolation of up-down (i.e. perpendicular) vibrations and isolation of front-back and right-left (i.e. horizontal) vibrations during running.

[Solution] A vibration isolation device for isolating vibrations during movement of an electronic device 17 mounted on a moving body includes a lower plate 16 facing the moving body and serving as a base, an upper plate 31 supporting the electronic device 17, elastic members 32 interposed between the lower plate 16 and the upper plate 31 and each fixed to the lower plate 16 and the upper plate 31, and a regulating member 33 that regulates horizontal vibrations of the electronic device 17.

11 Claims, 16 Drawing Sheets

B-B

VIBRATION ISOLATION DEVICE

TECHNICAL FIELD

The present invention relates to a vibration isolation device that isolates vibrations during movement of an electronic device mounted on a moving body.

BACKGROUND ART

Conventionally, there has been disclosed an autonomous-running-type vehicle including a vibration isolation device for isolating vibrations during running (see, for example, PTL 1).

PTL 1 discloses an automated guided vehicle configured such that an automated guided vehicle body is installed on a truck of the automated guided vehicle via vibration isolation dampers, that locking members are provided in correspondence with fixing plates provided on the automated guided vehicle body, and that the fixing plates are locked by the locking members when transfer is made, whereby vibrations of an article conveyed by the automatic guided vehicle are efficiently isolated.

CITATION LIST

Patent Literature

PTL 1: Japanese Unexamined Patent Application Publication No. 2001-298065

SUMMARY OF INVENTION

Technical Problem

The automated guided vehicle disclosed in PTL 1 is intended to convey an article, and such a vibration isolation device cannot be simply applied to a moving body obtained by mounting an autonomous-running-type vehicle with a monitoring device.

A monitoring device that is mounted on a moving body includes various types of mechanical section such as a pan tilt function and a zoom function so that an image can be taken while a camera is being turned 360-degree during running. Further, the camera mounted is a high-precision camera for use in monitoring, and is required to take a high-precision image with little blurring.

Meanwhile, a moving body mounted with a monitoring device (hereinafter simply referred to as "moving body") performs monitoring by freely running within vast grounds, and the grounds include not only paved areas but also places where it cannot smoothly run, such as some irregularities, turf, pebbles, and gravel. This causes the moving body to be subjected to various shocks (vibrations) from the road surface during running.

Therefore, a moving body needs a vibration isolation mechanism for preventing failures in various types of mechanical section due to vibrations during running, blurring of shot images due to vibrations during running, and the like. In particular, in a case where the moving body is mounted with a monitoring device, there has been a demand for a vibration isolation device that brings about greater vibration isolating effects.

The present invention has been created to solve the foregoing problems, and it is an object of the present invention to provide a vibration isolation device that can bring about great vibration isolating effects through a combination of isolation of up-down (i.e. perpendicular) vibrations and isolation of front-back and right-left (i.e. horizontal) vibrations during running.

Solution to Problem

In order to solve the foregoing problems, a vibration isolation device of the present invention is a vibration isolation device for isolating vibrations during movement of an electronic device mounted on a moving body, including: a lower plate facing the moving body and serving as a base; an upper plate supporting the electronic device; elastic members interposed between the lower plate and the upper plate and each fixed to the lower plate and the upper plate; and a regulating member that regulates horizontal vibrations of the electronic device.

The foregoing configuration makes it possible to bring about great vibration isolating effects by, during running, isolating up-down (i.e. perpendicular) vibrations mainly with the elastic members and isolating front-back and right-left (i.e. horizontal) vibrations (specifically, the horizontal movement due to the force of inertia that is received during acceleration, deceleration, or the like of the moving body: Same applies below) mainly with the regulating member.

Further, the vibration isolation device of the present invention is configured such that the regulating member includes a regulating pin provided to stand vertically on the lower plate and a loose-fit hole formed in the upper plate, and the loose-fit hole is loosely fitted on the regulating pin.

This configuration makes it possible to surely isolate (reduce) horizontal vibrations.

Further, the vibration isolation device of the present invention is configured such that a plurality of the regulating pins and a plurality of the loose-fit holes are formed in a plurality of places.

By thus disposing regulating members in a plurality of places, e.g. in two places at the front and back or on the right and left of the direction of travel, or uniformly disposing them, for example, in three or four places around an area centered at the electronic device mounted, the electronic device can be prevented from rotating or tilting even when subjected to a horizontal shock load.

Further, the vibration isolation device of the present invention is configured such that the lower plate is disposed in a horizontal direction along a direction of travel of the moving body, the upper plate is disposed parallel to the lower plate via the elastic members, and the regulating pin is provided to stand perpendicularly to the lower plate.

According to this configuration, horizontal vibrations of the electronic device due to vibrations during running can be surely reduced by the regulating pin.

Further, the vibration isolation device of the present invention may be configured to further include an exterior cover fixed to the lower plate so as to encapsulate the electronic device, and configured such that the regulating member is constituted by the exterior cover and another elastic member interposed in a surrounding clearance between the exterior cover and the electronic device.

This configuration too makes it possible to surely isolate (reduce) horizontal vibrations. Further, since this configuration makes it only necessary to add an elastic member to the exterior cover, which has conventionally been fitted, it eliminates the need to provide the lower plate with a regulating pin, thus making it also possible to reduce manufacturing costs.

Further, the vibration isolation device of the present invention is preferably configured such that fixing positions between the upper plate and the elastic members are higher positions than a bottom face of the electronic device, and is more preferably configured such that the fixing positions between the upper plate and the elastic members are positions at a center of gravity in a height direction of the electronic device or nearby positions.

According to this configuration, the upper plate and the elastic members are fixed to each other in high positions, whereby horizontal vibrations, i.e. the horizontal movement (i.e. wobbling) due to the force of inertia that is received during acceleration, deceleration, or the like of the moving body, can be reduced.

Further, the vibration isolation device of the present invention may be configured such that fixing positions between the lower plate and the regulating member include at least two places that differ in position from each other with respect to a height direction of the electronic device.

Since the lower plate and the regulating member are fixed to each other in two places that differ in position from each other with respect to the height direction of the electronic device, great vibration isolating effects can be brought about by better inhibiting a tilt than regulation at the same height position and isolating front-back and right-left vibrations with the regulating member.

Further, the vibration isolation device of the present invention may be configured such that the fixing positions between the lower plate and the regulating member face the bottom face and a lateral face of the electronic device.

According to this configuration, the lower plate and the regulating member are fixed to each other in positions, facing the bottom face and lateral face of the electronic device, that differ in height from each other.

Further, the vibration isolation device of the present invention may be configured such that the elastic members are disposed in at least two places at a front and back of the electronic device with respect to the direction of travel of the moving body, and the elastic member disposed at the front is larger in load-carrying capacity than the elastic member disposed at the back.

According to this configuration, in a case where the moving body is for example at an emergency stop, a great force of inertia acts on the electronic device too so that the electronic device wobbles in such a way as to move suddenly toward the front; however, making the elastic members disposed at the front larger in load-carrying capacity makes it possible to sufficiently receive the electronic device even in such a case.

Further, the vibration isolation device of the present invention may be configured such that the electronic device is a monitoring device mounted with a camera. Application of the vibration isolation device to the monitoring device makes it possible to surely prevent failures in various types of mechanical section such as a pan tilt function and a zoom function due to vibrations during running, blurring of shot images due to vibrations during running, and the like.

Further, the vibration isolation device of the present invention may be configured such that the monitoring device is disposed together with the upper plate at a downward tilt in the direction of travel of the moving body.

The monitoring device mounted on the moving body is movable upward and downward by a link mechanism (move function), and is disposed at a height of approximately 1 m above the ground even in a state where the link mechanism is folded (i.e. a state where the link mechanism is stowed in the moving body). Therefore, a camera disposed at the height in parallel to a horizontal direction cannot capture, for example, an object that goes across right in front of the moving body. To address this problem, disposing the monitoring device at a downward tilt in the direction of travel of the moving body makes it also possible to monitor a foot part of the moving body.

Advantageous Effects of Invention

The present invention makes it possible to bring about great vibration isolating effects by, during running of the moving body, isolating up-down (i.e. perpendicular) vibrations mainly with the elastic members and isolating front-back and right-left (i.e. horizontal) vibrations (specifically, the horizontal movement due to the force of inertia that is received during acceleration, deceleration, or the like of the moving body) mainly with the regulating member.

DESCRIPTION OF EMBODIMENTS

The following describes embodiments of the present invention with reference to the drawings.

Figure 1:
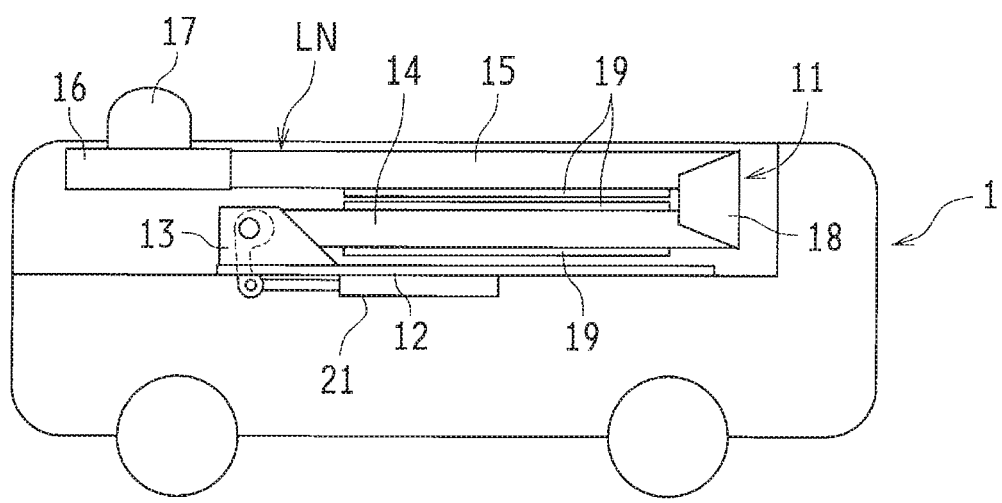
FIG. 1 is a schematic side view of a moving body mounted with a vibration isolation device of the present invention.
Figure 2:
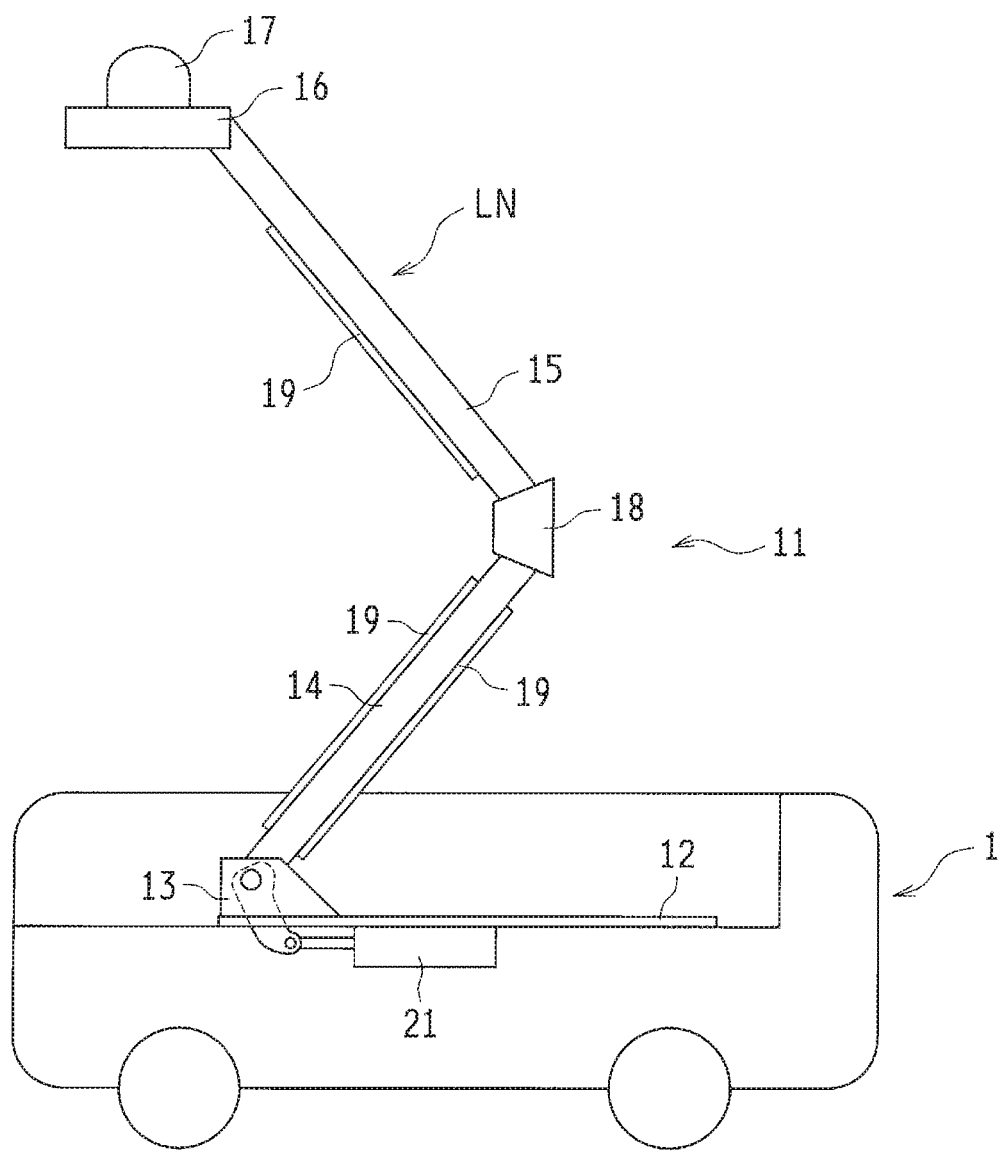
FIG. 2 is a schematic side view of the moving body mounted with the vibration isolation device of the present invention.

FIGS. 1 and 2 are schematic side views of a moving body mounted with a vibration isolation device of the present invention, and FIG. 2 shows a state where a lifting and lowering device is extended.

A moving body 1 according to the present invention is a four-wheel vehicle that moves along a preset route, and is driven by an electric motor provided inside. The speed and direction of travel of the moving body 1 is controlled by a computer. The right and left wheels of the moving body 1 are each independently driven and controlled. By making the wheels different in rotational speed from one another, the direction of travel can be changed, and by making the wheels opposite in rotational direction from one another, turning (stationary turning) can be made without a change in position. It should be noted that the moving body 1 is not limited to this but may have a different number of wheels or use a belt or the like.

The moving body 1 has a recess formed in an upper surface thereof, with a lifting and lowering device 11 stowed in the recess. The lifting and lowering device 11 includes a link mechanism LN that lifts and lowers a lifting and lowering stage 16, a lower base 13 supporting a lower end of the link mechanism LN, the lifting and lowering stage 16, which is provided at an upper end of the link mechanism LN, and a driving section 21 that drives the link mechanism LN.

The link mechanism LN includes a plurality of supporting members that are elongated (namely a lower supporting member 14 and an upper supporting member 15) and a coupling plate 18 that couples ends of the adjacent supporting members to each other in a longitudinal direction.

In FIG. 1, the lifting and lowering device 11 is in a folded state of being folded so that long sides of the lower supporting member 14 and the upper supporting member 15 are opposed to each other. In contrast to this, making a rotation with the ends of the plurality of supporting members as a fulcrum brings about an extended state where the link mechanism LN is extended upward as shown in FIG. 2. The lifting and lowering stage 16 is kept horizontal with respect to the road surface by the link mechanism LN regardless of lifting and lowering position.

It should be noted that a concrete structure of the lifting and lowering device 11 is not described in detail here, as a variety of conventionally well-known structures can also be employed in the present invention.

On the lifting and lowering stage 16, a monitoring device 17, which is an example of an electronic device of the present invention, is mounted. The monitoring device 17 includes, for example, a camera, various types of sensor, and the like. The camera includes various types of mechanical section such as a pan tilt function and a zoom function so that an image can be taken (monitoring can be performed) while the camera is being turned 360-degree during running. The monitoring device 17 monitors an immediate environment around the moving body 1 with the camera and the various types of sensor. Further, lifting the lifting and lowering stage 16 with the lifting and lowering device 11 enables the monitoring device 17 to perform monitoring from a high place.

In the moving body 1 thus configured, the present invention disposes a vibration isolation device 30 according to the present invention between the lifting and lowering stage 16 and the monitoring device 17. The following describes embodiments of the vibration isolation device 30 according to the present invention.

Embodiment 1

Figure 3:
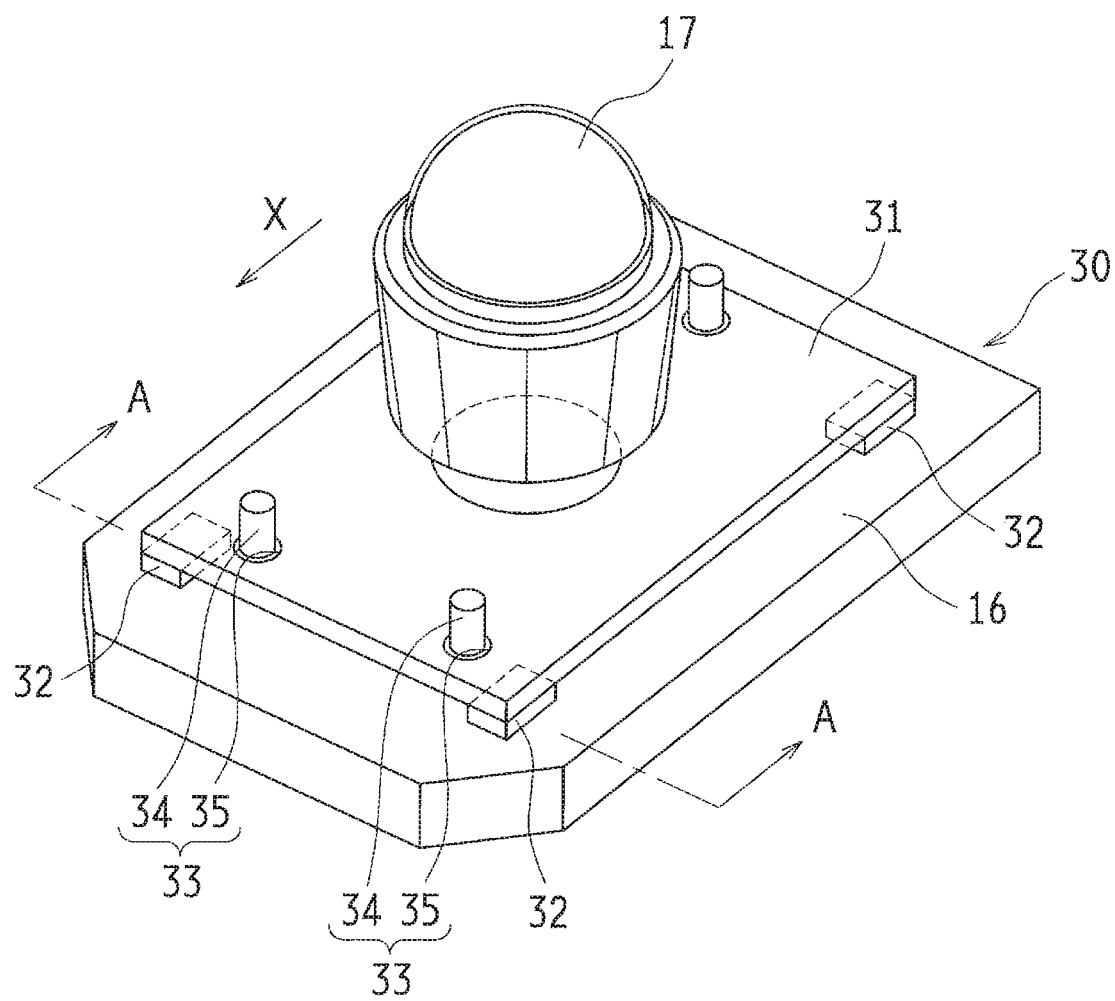
FIG. 3 is a perspective view showing, from an overhead point of view, a state where a monitoring device is mounted on a lifting and lowering stage with use of a vibration isolation device according to Embodiment 1.
Figure 4:
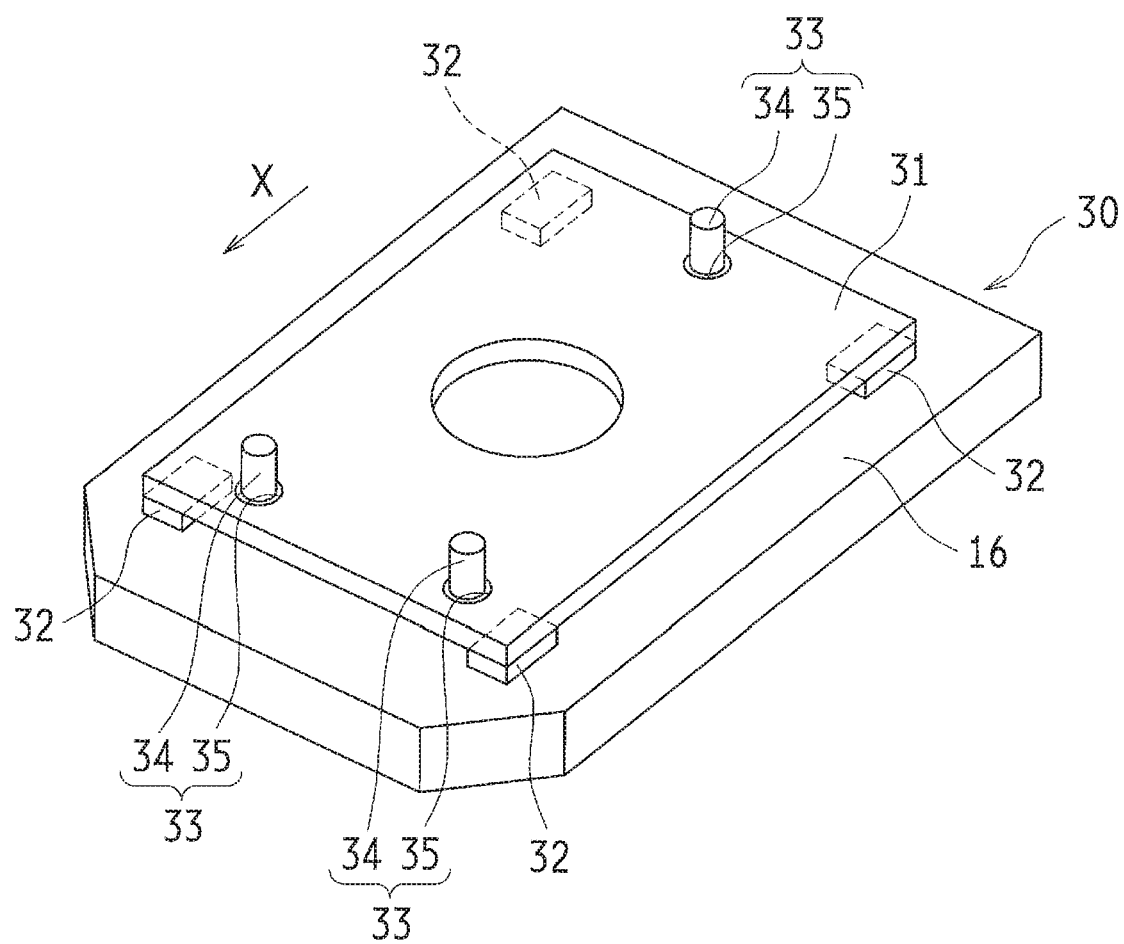
FIG. 4 is a perspective view showing only a part of the vibration isolation device from which the monitoring device has been removed out of the mounted state shown in FIG. 3.
Figure 5:
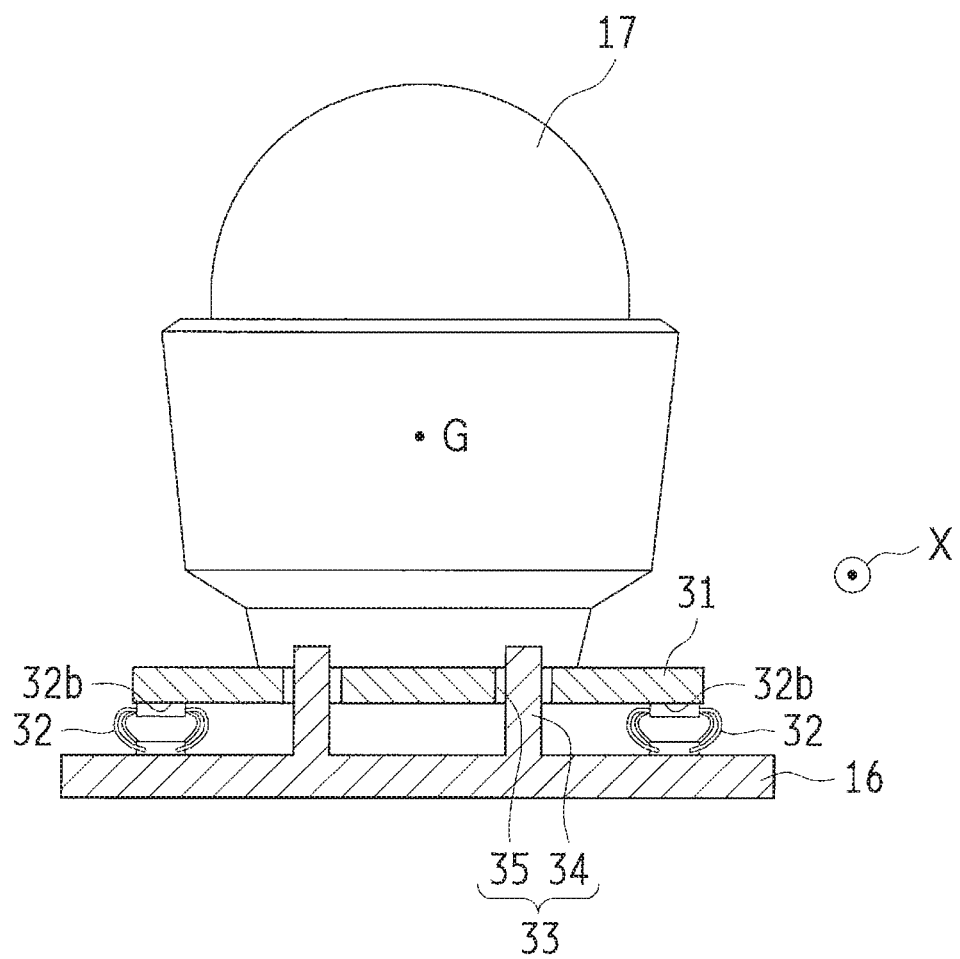
FIG. 5 is a cross-sectional view taken along line A-A in FIG. 3.

FIG. 3 is a perspective view showing, from an overhead point of view, a state where a monitoring device 17 is mounted on a lifting and lowering stage 16 with use of a vibration isolation device 30 according to Embodiment 1. FIG. 4 is a perspective view showing only a part of the vibration isolation device 30 from which the monitoring device 17 has been removed out of the mounted state shown in FIG. 3. FIG. 5 is a cross-sectional view taken along line A-A in FIG. 3.

The vibration isolation device 30 according to Embodiment 1 includes a lifting and lowering stage (lower plate) 16 facing the moving body 1 and serving as a base, a supporting plate (upper plate) 31 supporting a bottom face of the monitoring device 17, a plurality of elastic members 32 interposed between the lifting and lowering stage 16 and the supporting plate 31 and each fixed to the lifting and lowering stage 16 and the supporting plate 31, and a regulating member 33 that regulates horizontal vibrations of the monitoring device 17.

The lifting and lowering stage 16 and the supporting plate 31 are both formed in rectangular shapes in Embodiment 1, and the elastic members 32 are disposed at four opposed corners, respectively, of the lifting and lowering stage 16 and the supporting plate 31.

The lifting and lowering stage 16 is disposed in a horizontal direction along a direction of travel X of the moving body 1, and the supporting plate 31 is disposed parallel to the lifting and lowering stage 16 via the four elastic members 32. That is, in a state where the moving body 1 is at a stop, a load of the monitoring device 17 is evenly received by the four elastic members 32.

Note here that the elastic members 32 mainly serve to receive up-down (perpendicular) vibrations and usable examples of the elastic members 32 include conventionally well-known wire vibration isolators. Further, other usable examples of the elastic members 32 include conventionally well-known rubber vibration isolator and gel vibration isolators. Since these vibration isolators have their respective characteristics, they need only be properly used depending on the purposes. For example, vibration isolators of the same type may be used in all of the four places. Alternatively, vibration isolators of one type may be used at the front, and vibration isolators of another type may be used at the back. Further, the number of elastic members 32 is not limited to 4. Alternatively, a total of six elastic members 32 may be provided, for example, so that three of them are placed at the front and the other three are placed at the back. The placement and number of elastic members 32 that are provided need only be appropriately selected on an as-needed basis.

Meanwhile, in Embodiment 1, the regulating member 33 includes a columnar regulating pin 34 provided to stand vertically on the lifting and lowering stage 16 and a circular loose-fit hole 35 formed in the supporting plate 31, and is configured such that the regulating pin 34 is loosely fitted in the loose-fit hole 35. That is, the loose-fit hole 35 has an inner diameter set to be slightly wider in diameter (for example, by a diameter difference of approximately 0.1 mm)

than an outer diameter of the regulating pin 34. Further, the regulating pin 34 is disposed so as to pass through the loose-fit hole 35 toward a higher position than the supporting plate 31.

This configuration makes it possible to surely isolate (reduce) horizontal vibrations, particularly the front-back swinging of the monitoring device 17 due to the force of inertia that is received during acceleration, deceleration, or the like of the moving body 1. Further, as for up-down vibrations, the supporting plate 31 can vibrate (move) in up-down directions with respect to the lifting and lowering stage 16, as the regulating pin 34 is loosely fitted in the loose-fit hole 35. At this point in time, the regulating pin 34 plays a role as a guide pin when the supporting plate 31 moves up and down.

Further, in Embodiment 1, such regulating members 33 each including a regulating pin 34 and a loose-fit hole 35 are provided in a plurality of places (in this example, three places) around the monitoring device 17. Specifically, a total of three regulating members 33 are provided so that two of them are placed on the right and left, respectively, in front of the monitoring device 17 (forward in the direction of travel X) and the other one is placed in the center behind the monitoring device 17. These three regulating members 33 are disposed to, when seen in a plan view, form an equilateral triangle or an isosceles triangle whose base faces forward in the direction of travel X.

That is, the even placement of a plurality of regulating members 33 (in this example, a total of three regulating members 33, two of which are forward in the direction of travel X and the other one of which is backward in the direction of travel X) makes it possible to prevent the monitoring device 17 from rotating or tilting even in the event of horizontal swinging (including not only the force of inertia during acceleration or deceleration of the moving body but also the shock load of an unexpected collision or the like), although, in a case where only one regulating member 33 is provided, the monitoring device 17 mounted on the supporting plate 31 may rotate or tilt with respect to the lifting and lowering stage 16.

Therefore, at least two regulating members 33 need only be disposed. For example, the placement and number of regulating members 33 that are provided need only be appropriately set on an as-needed basis, for example, so that two regulating members 33 are placed at the front and back or on the right and left, respectively, of the monitoring device 17 or so that, for example, three (in the case of Embodiment 1) or four regulating members 33 are placed around an area centered at the monitoring device 17.

Embodiment 1 makes it possible to bring about great vibration isolating effects by, during running, isolating up-down (i.e. perpendicular) vibrations mainly with the elastic members 32 and isolating front-back and right-left (i.e. horizontal) vibrations mainly with the regulating members 33.

That is, vibrations of frequencies of approximately 5 to 20 Hz are isolated by disposing wire vibration isolators or rubber/gel vibration isolators at the four corners of the supporting plate 31. Further, low-frequency (0.5 to 5 Hz) vibrations that are categorized as shocks or vibrations caused by front-back and right-left acceleration shocks or the like are isolated by regulating members 33 disposed, for example, at the front, at the back, on the right, and on the left.

Such application of the vibration isolation device 30 according to the present invention to the monitoring device 17 mounted with a camera makes it possible to surely prevent failures in various types of mechanical section such as a pan tilt function and a zoom function due to vibrations during running of the moving body 1, blurring of camera-shot images due to vibrations during running of the moving body 1, and the like.

Embodiment 2

Figure 6:
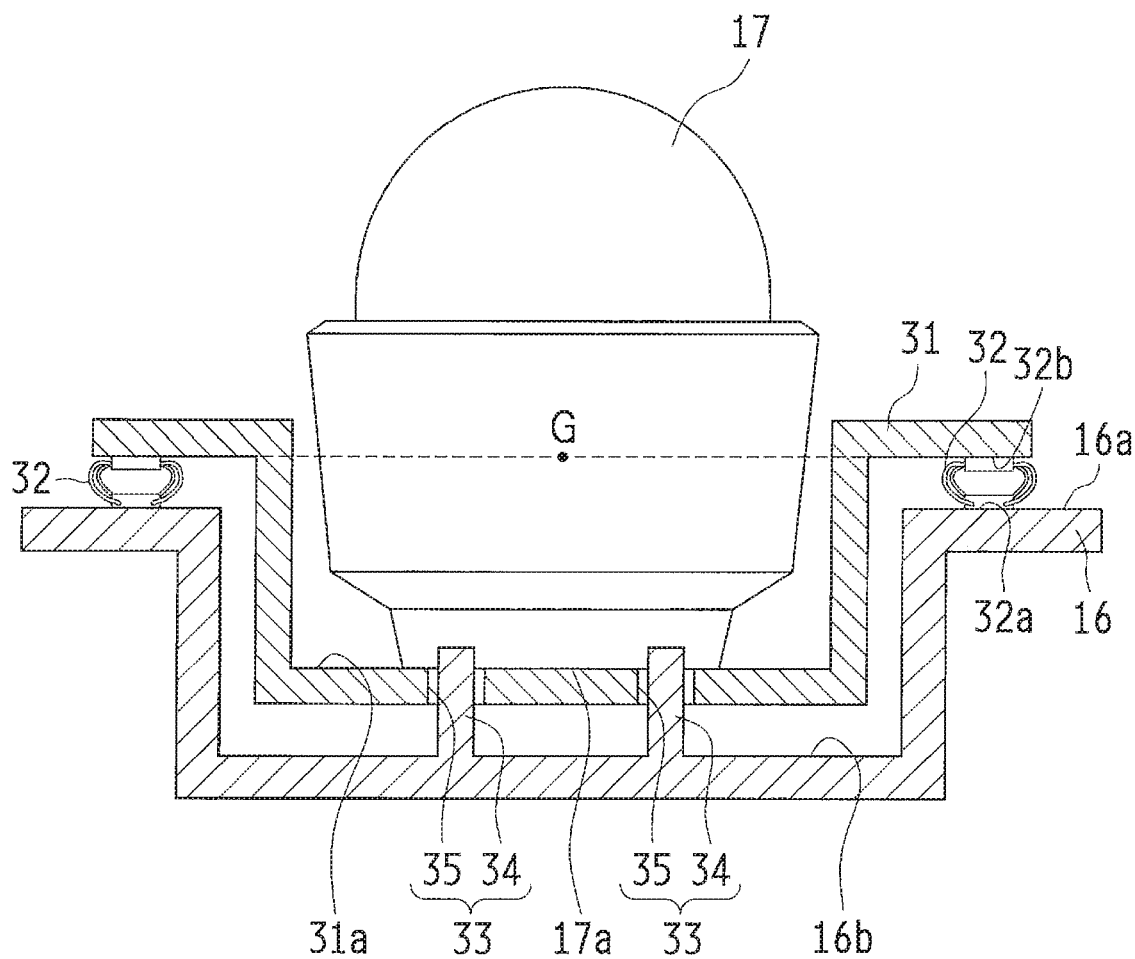
FIG. 6 is a perspective view showing a state where a monitoring device is mounted on a lifting and lowering stage with use of a vibration isolation device according to Embodiment 2.

FIG. 6 is a perspective view showing a state where a monitoring device 17 is mounted on a lifting and lowering stage 16 with use of a vibration isolation device 30 according to Embodiment 2.

Embodiment 2 differs from Embodiment 1 in terms of the fixing positions in which the elastic members 32 are fixed. Therefore, since Embodiment 2 is identical to Embodiment 1 in terms of the other components, the following describes only different parts, assigns the same signs to constituent members of Embodiment 2 which are identical to those of Embodiment 1, and omits to describe those constituent members in detail.

In Embodiment 1 described above, the elastic members 32 and the supporting plate 31 are fixed to each other in lower positions than the bottom face of the monitoring device 17 (i.e. lower positions than the center of gravity G of the monitoring device 17). Therefore, the force of front-back and right-left swinging of the monitoring device 17 directly impacts fixing surfaces (particularly contact and fixing positions with the supporting plate 31) 32b of the elastic members 32 that are in lower positions than the center of gravity G (i.e. positions that are farther away in a height direction), with the result that a greater force is applied to the elastic members 32.

To address this problem, Embodiment 2 is configured such that the contact and fixing positions 32b between the supporting plate 31 and upper sides of the elastic members 32 are higher positions than the bottom face of the monitoring device 17. Specifically, as shown in FIG. 6, a recess 16b is formed by denting a mounting surface 16a of the lifting and lowering stage 16 into a rectangular shape, and a recess 31a is formed by denting, into a rectangular shape, a part of the supporting plate 31, opposed to the lifting and lowering stage 16, on which the monitoring device 17 is mounted. For this reason, contact and fixing positions 32a between the lifting and lowering stage 16 and lower sides of the elastic members 32 and the contact and fixing positions 32b between the supporting plate 31 and the upper sides of the elastic members 32 are provided to be sufficiently higher positions than a bottom face 17a of the monitoring device 17 mounted in the recess 31a of the supporting plate 31. More specifically, the contact and fixing positions 32b between the supporting plate 31 and the upper sides of the elastic members 32 are disposed to be positions at the center of gravity G in a height direction of the monitoring device 17 or nearby positions. However, in FIG. 6, the contact and fixing positions 32b between the supporting plate 31 and the upper sides of the elastic members 32 are disposed to coincide with positions at the center of gravity G in the height direction of the monitoring device 17.

According to this configuration, the supporting plate 31 and the upper sides of the elastic members 32 are fixed to each other in positions at the center of gravity of the monitoring device 17 or nearby positions, whereby horizontal vibrations, i.e. the horizontal wobbling (i.e. movement) of the monitoring device 17 due to the force of inertia that is received during acceleration, deceleration, or the like of the moving body 1 can be reduced. This makes it possible to bring about greater vibration isolating effects.

Embodiment 3

Figure 7:
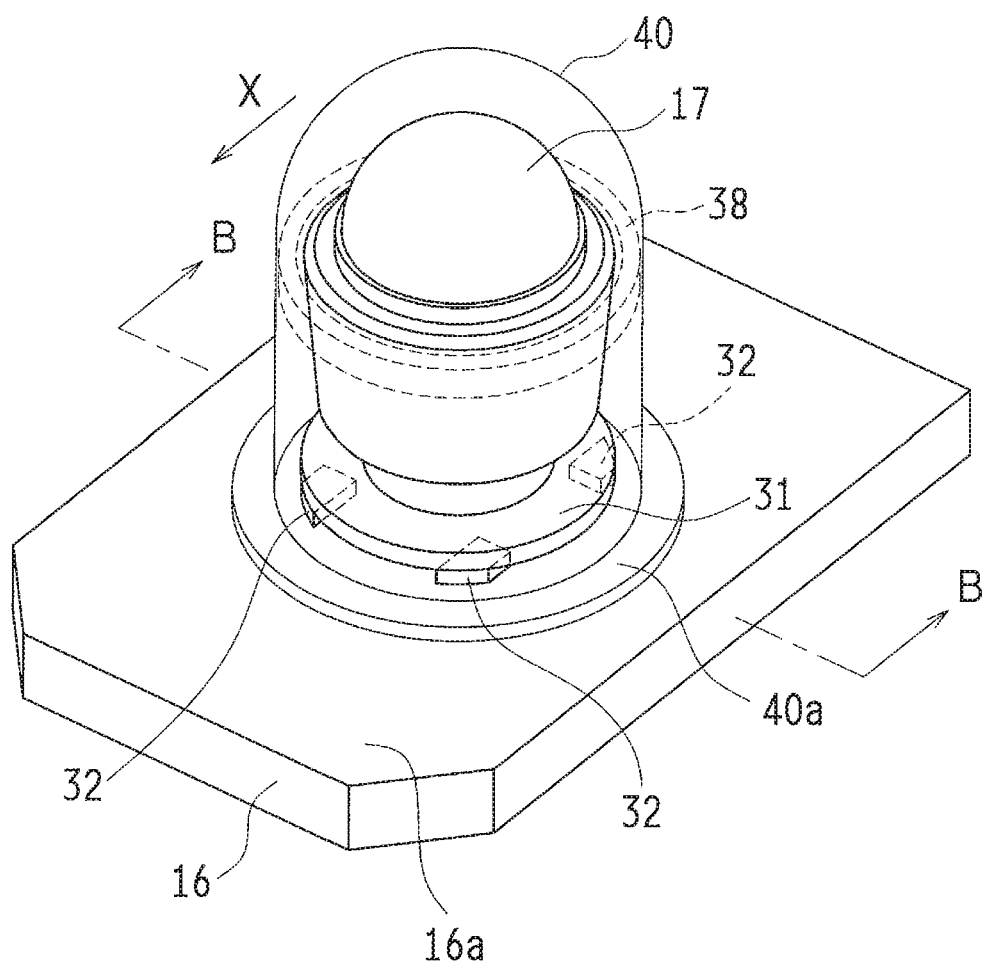
FIG. 7 is a perspective view showing a state where a monitoring device is mounted on a lifting and lowering stage with use of a vibration isolation device according to Embodiment 3.
Figure 8:
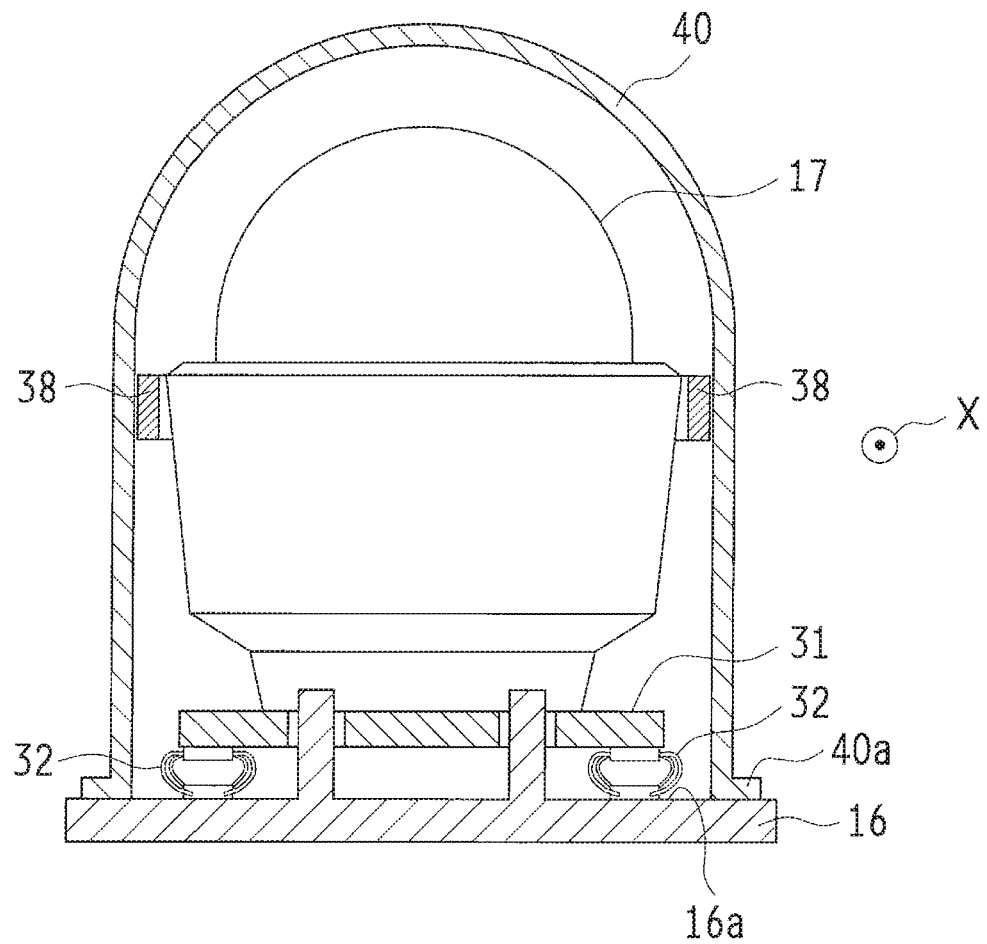
FIG. 8 is a schematic cross-sectional view taken along line B-B in FIG. 7.

FIG. 7 is a perspective view showing, from an overhead point of view, a state where a monitoring device 17 is mounted on a lifting and lowering stage 16 with use of a vibration isolation device 30 according to Embodiment 3. FIG. 8 is a schematic cross-sectional view taken along line B-B in FIG. 7.

Embodiment 3 differs from Embodiment 1 in that whereas Embodiment 1 is configured such that the regulating member 33 includes the regulating pin 34 and the loose-fit hole 35, Embodiment 3 is configured such that an exterior cover is utilized to constitute a regulating member 33. Therefore, since Embodiment 3 is identical to Embodiment 1 in terms of the other components, the following describes only different parts, assigns the same signs to constituent members of Embodiment 3 which are identical to those of Embodiment 1, and omits to describe those constituent members in detail.

That is, among moving bodies 1 mounted with monitoring devices 17, there is a type in which the monitoring device 17 is entirely covered with an exterior cover 40 formed by a transparent dome-shaped resin or the like. Therefore, in Embodiment 3, this exterior cover 40 is utilized to constitute a regulating member 33.

Specifically, the monitoring device 17 has a domical shape, and in conformance with this shape, the exterior cover 40 is formed into a domical shape whose bottom face has an opening. Further, the supporting plate 31 is formed into a discoidal shape in conformance with the shapes of the monitoring device 17 and the exterior cover 40. The exterior cover 40 has a bottom face opening edge 40a fixedly mounted on the mounting surface 16a of the lifting and lowering stage 16 so that the supporting plate 31, on which the monitoring device 17 has been mounted, is entirely encapsulated.

In this case, there is a comparatively narrow clearance between an inner circumferential surface of the exterior cover 40 and an outer circumferential surface of the base of the upper hemisphere, which is the widest part of the monitoring device 17. Therefore, in Embodiment 3, another elastic member (hereinafter referred to as "annular elastic member") 38 formed in an annular shape (ring shape) is interposed as a regulating member 33 in this clearance. This annular elastic member 38 is fixedly bonded to the inner circumferential surface of the exterior cover 40 with an adhesive or the like, with a little clearance between an inner circumferential surface of the annular elastic member 38 and the outer circumferential surface of the monitoring device 17. This clearance needs only be set, for example, to have substantially the same width (e.g. approximately 0.1 mm) as the diameter difference between the loose-fit hole 35 and the regulating pin 34 of Embodiment 1. As for up-down vibrations, this clearance enables the monitoring device 17 fixedly mounted on the supporting plate 31 to vibrate (move) in up-down directions with respect to the lifting and lowering stage 16. At this point in time, the annular elastic member 38 plays a role as a guide member when the monitoring device 17 moves up and down. Further, as for horizontal vibrations, the annular elastic member 38 surely isolate (reduce) vibrations of the monitoring device 17.

Further, since Embodiment 3 makes it only necessary to add the annular elastic member 38 to the exterior cover 40, which has conventionally been fitted, it eliminates the need to provide the lifting and lowering stage 16 with a regulating pin and provide the supporting plate 31 with a loose-fit hole 35, thus making it also possible to reduce manufacturing costs.

Embodiment 4

Figure 9:
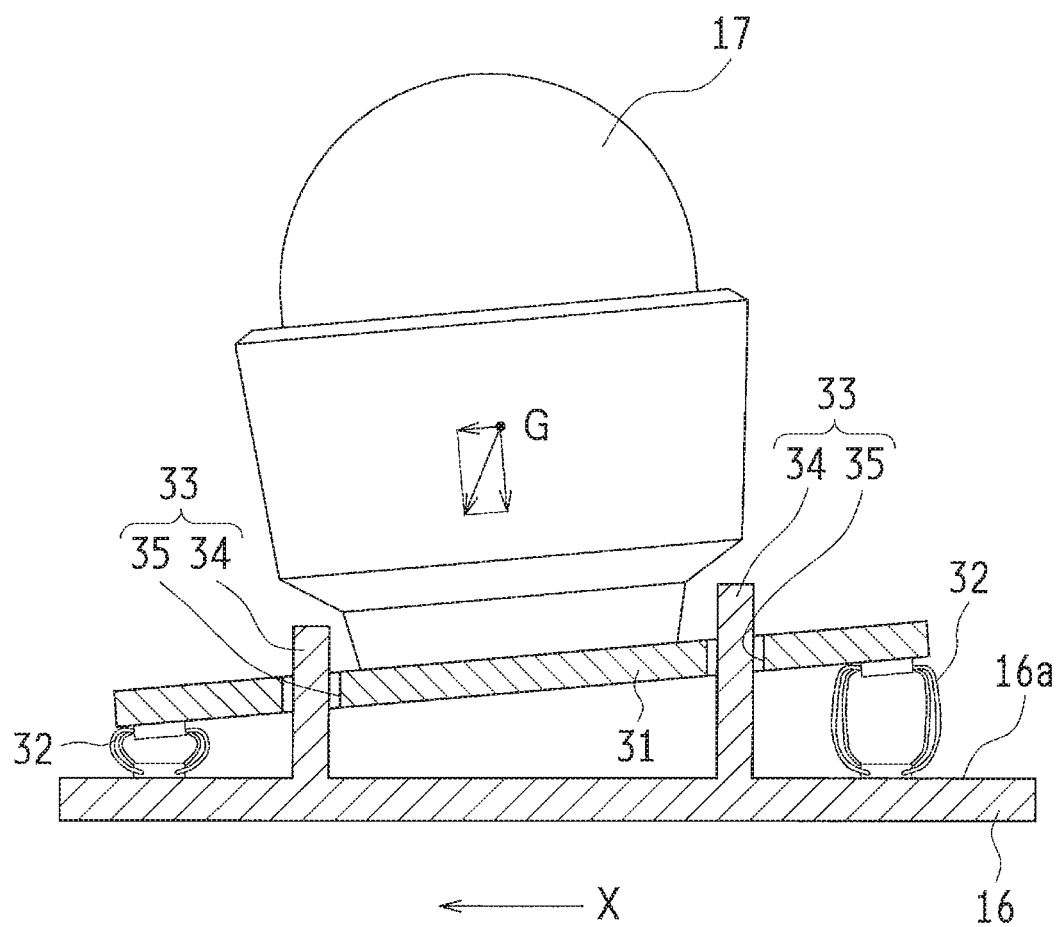
FIG. 9 is a schematic cross-sectional view showing a state where a monitoring device is mounted on a lifting and lowering stage with use of a vibration isolation device according to Embodiment 4.

FIG. 9 is a schematic cross-sectional view showing a state where a monitoring device 17 is mounted on a lifting and lowering stage 16 with use of a vibration isolation device 30 according to Embodiment 4. Note, however, that the cross-sectional view shown in FIG. 9 is a cross-sectional view taken along the direction of travel X of the moving body 1, and differs in cross-section direction by 90 degrees from cross-sectional views such as FIGS. 5 and 6.

That is, whereas each of Embodiments 1 and 2 is configured such that the monitoring device 17 is always disposed in parallel (i.e. in a horizontal state) with respect to the lifting and lowering stage 16, Embodiment 4 is configured such that the monitoring device 17 is disposed at a downward tilt toward the front (in FIG. 9, the left) along the direction of travel X of the moving body 1.

That is, the supporting plate 31, on which the monitoring device 17 has been fixedly mounted, is disposed at a downward tilt toward the front (in the direction of travel X) with respect to the mounting surface 16a of the lifting and lowering stage 16. The angle of tilt θ is for example approximately 5 degrees.

The monitoring device 17 mounted on the moving body 1 is disposed at a height of approximately 1 m above the ground even in the folded state where the long sides of the lower supporting member 14 and the upper supporting member 15 are opposed to each other. Therefore, a camera disposed at the height in parallel to a horizontal direction cannot capture, for example, an object that goes across right in front of the moving body 1. To address this problem, disposing the monitoring device 17 at a slight downward tilt toward the front along the direction of travel X of the moving body 1 as in the case of Embodiment 4 makes it possible to monitor a foot part of the moving body 1 that is forward in the direction of travel.

In this case, disposing the monitoring device 17 at a tilt forward in the direction of travel X causes a large load to be always applied forward to the supporting plate 31, so that the front is subjected to greater vibrations or shocks during running. Therefore, Embodiment 4 is configured such that the load-carrying capacity of two elastic members 32 disposed farther forward than the monitoring device 17 is larger than the load-carrying capacity of two elastic members 32 disposed at the back.

Specifically, in a case where rubber vibration isolators or gel vibration isolators are used as the elastic members 32, the two elastic members 32 disposed at the front (in FIG. 9, on the left) can be made larger in load-carrying capacity than the two elastic members 32 disposed at the back (in FIG. 9, on the right) by being made smaller in size (i.e. length of elasticity in a height direction) than the two elastic members 32 disposed at the back and being made of a hard material. Further, in a case where wire vibration isolators are used as the elastic members 32, the wire vibration isolators disposed at the front can be made larger in load-carrying capacity than the wire vibration isolators disposed at the back by being made larger in wire thickness than the wire vibration isolators disposed at the back.

It should be noted that the load-carrying capacity as a whole may be made larger than at the back by disposing different numbers of elastic members 32 at the front and back, e.g. disposing three elastic members 32 of the same size and material at the front, instead of making the front elastic members 32 different in size, material, thickness, or the like from the back elastic members 32.

Further, although the regulating pins 34 and the loose-fit holes 35 are identical to those of Embodiments 1 and 2, the back regulating pin 34 is longer than the front regulating pin 34, as the supporting plate 31 is disposed at a tilt.

According to this configuration, in a case where the moving body 1 is for example at an emergency stop, a great force of inertia acts on the monitoring device 17 so that the monitoring device 17 wobbles in such a way as to move suddenly toward the front; however, making the elastic members disposed at the front larger in load-carrying capacity makes it possible to sufficiently receive the monitoring device 17 even in such a case.

Embodiment 5

Figure 10:
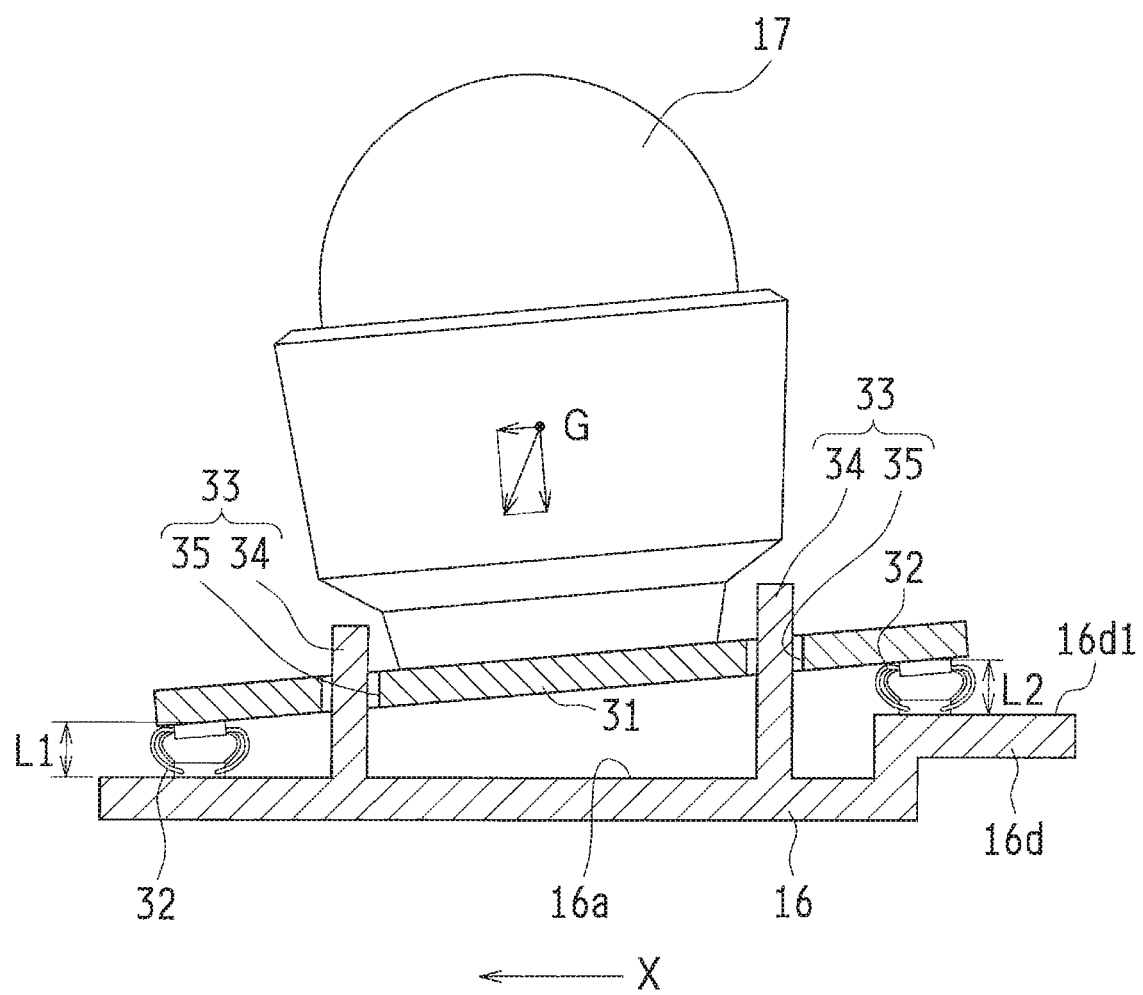
FIG. 10 is a schematic cross-sectional view showing a state where a monitoring device is mounted on a lifting and lowering stage with use of a vibration isolation device according to Embodiment 5.

FIG. 10 is a schematic cross-sectional view showing a state where a monitoring device 17 is mounted on a lifting and lowering stage 16 with use of a vibration isolation device 30 according to Embodiment 5. Note, however, that the cross-sectional view shown in FIG. 10 too is a cross-sectional view taken along the direction of travel X of the moving body 1, and differs in cross-section direction by 90 degrees from cross-sectional views such as FIGS. 5 and 6.

Embodiment 5 is a modification of Embodiment 4. Whereas Embodiment 4 is configured such that the distance of the supporting plate 31 to the lifting and lowering stage 16 in a height direction is absorbed by the magnitude of size, material, wire thickness, or the like of the elastic members 32, Embodiment 5 is configured such that a step 16$d$ projecting upward is provided at the back of the lifting and lowering stage 16. That is, the disposition of elastic members 32 of the same size, shape, or the like at the front and back is enabled by making a distance L1 and a distance L2 substantially equal to each other (L1≈L2). The distance L1 is the distance from the mounting surface 16$a$ of the lifting and lowering stage 16 to the supporting plate 31 at the front of the supporting plate 31, and the distance L2 is the distance from a mounting surface 16$d$1 of the step 16$d$ of the lifting and lowering stage 16 to the supporting plate 31 at the back of the supporting plate 31. That is, the use of the same elastic members 32 at the front and back is enabled. This also leads to reduced manufacturing costs.

In this case, however, it is necessary to make a contrivance, for example, to dispose a larger number of elastic members 32 at the front in order to attain a larger load-carrying capacity as a whole at the front.

Embodiment 6

Figure 11:
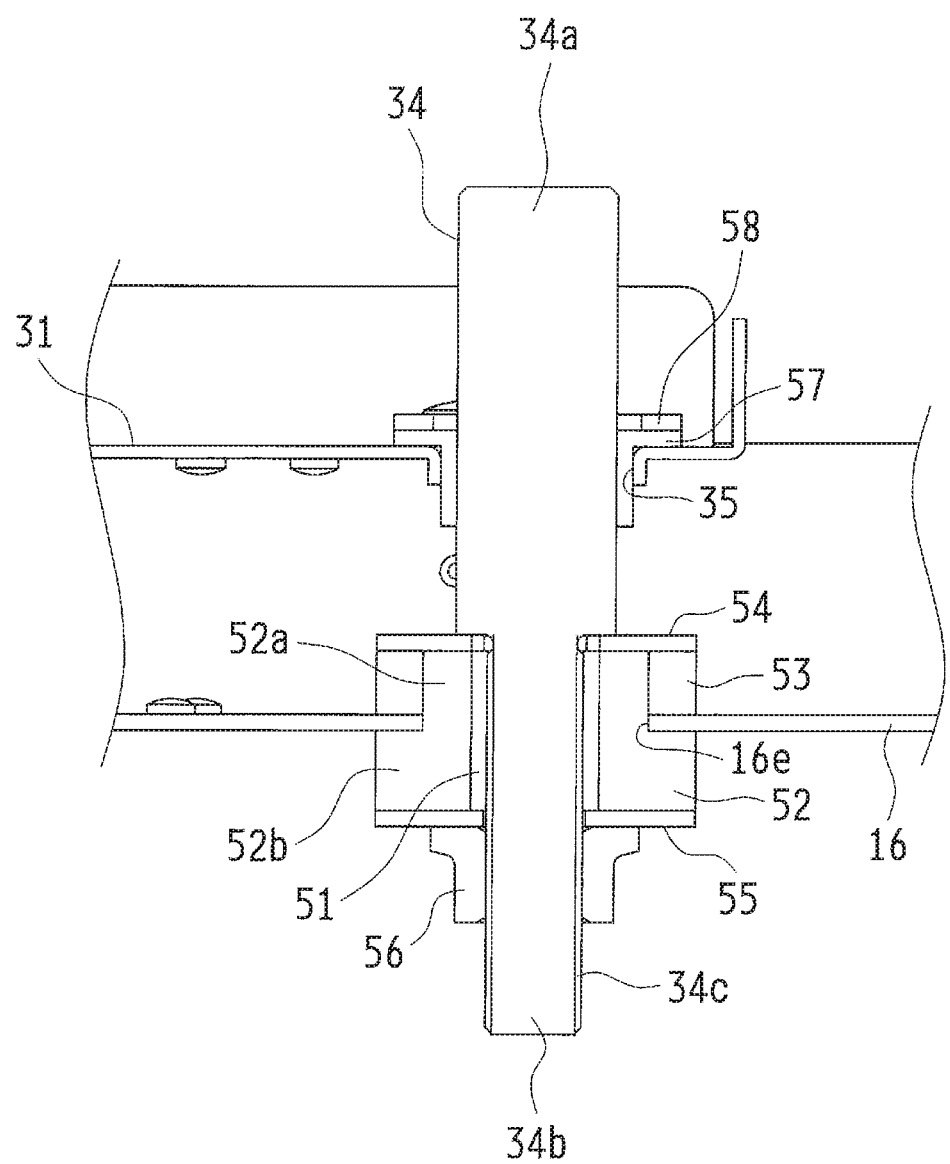
FIG. 11 is a cross-sectional view showing an example of a concrete configuration of a regulating pin and a loose-fit hole that constitute a regulating member.

FIG. 11 is a cross-sectional view showing an example of a concrete configuration of a regulating pin 35 and a loose-fit hole 34 that constitute a regulating member 33.

A structure by which the regulating pin 34 is fixed to the lifting and lowering stage 16 may be welding, simple fastening to the lifting and lowering stage 16 using a bolt and a nut, or the like; however, in the case of fastening, a contrivance is made to surely prevent looseness, dropouts, or the like from being caused by vibrations. The following gives a concrete description.

The regulating pin 34 includes a columnar body part 34$a$ and a columnar locking part 34$b$ projecting downward from a bottom face of the body part 34$a$ in a state of being recessed one step in a radial direction, with a male screw part 34$c$ formed on the outer surface of the locking part 34$b$.

A metal sleeve 51 having a cylindrical shape and a predetermined length is fitted on the locking part 34$b$, and a rubber bush 52 having a cylindrical shape and a predetermined length is fitted on the metal sleeve 51.

The rubber bush 52 is a nosed rubber bush including a body part 52$a$ inserted in an insertion hole 16$e$ formed in the lifting and lowering stage (sheet metal) 16 and a flange part 52$b$, formed on the outer surface of a lower side of the body part 52$b$, that comes into contact with a lower surface edge of the insertion hole 16$e$. The metal sleeve 51 is inserted in order to prevent the rubber bush 52 from being flattened. That is, the insertion of the metal sleeve 51 prevents the rubber bush 52 from being crushed more than necessary at the time of fastening.

In attaching the regulating pin 34, first, the body part 52$a$ is inserted into the insertion hole 16$e$ from below the lifting and lowering stage (sheet metal) 16 with the metal sleeve 51 fitted in an inner part of the rubber bush 52. Next, with an annular reinforcing rubber bush 53 fitted on the body part 52$a$ of the rubber bush 52 projecting upward from the insertion hole 16$e$, a metal washer 54 is attached onto upper surfaces of the rubber bush 52 and the reinforcing rubber bush 53, and the locking part 34$b$ of the regulating pin 34 is inserted from above into the metal sleeve 51 fitted in the rubber bush 52. Then, a metal washer 55 is attached onto a lower surface of the rubber bush 52, and a nut 56 is screwed onto the male screw part 34$c$ of the locking part 34$b$ for fastening, whereby the regulating pin 34 is fixed to stand on the lifting and lowering stage 16. At this point in time, the rubber bush 52 and the reinforcing rubber bush 53 are crushed by fastening but are prevented by the metal sleeve 51 from being further crushed, so that an optimum fastening force can be kept.

Meanwhile, the body part 34$a$ of the regulating pin 34 thus fixed to stand is inserted into the loose-fit hole 35 of the supporting plate 31, and to the loose-fit hole 35, a bearing part 57 is attached. The body part 34$a$ of the regulating pin 34 projects upward through the bearing part 57. Therefore, in this case, the bearing part 57 and the body part 34$a$ of the regulating pin 34 are configured such that there is a slight clearance (e.g. the aforementioned clearance of approximately 0.1 mm) between the bearing part 57 and the body part 34$a$ of the regulating pin 34. Further, a retaining plate body 58 is disposed on an upper side of the bearing part 57 in such a way as to hold the bearing part 57 in place. The plate body 58 is fixed to the supporting plate 31 using a screw (not illustrated) or the like.

It should be noted that such a fixing structure is a mere example and any fixing structure that can surely fix the regulating pin 34 to the lifting and lowering stage 16 will do.

Further, although the foregoing embodiment describes a case where a vibration isolation device of the present invention is applied to an autonomous-running-type monitoring robot mounted with a monitoring device, the vibration isolation device of the present invention is applicable not only to such a monitoring robot but also to various types of moving body in general mounted with electronic devices required to be isolated from vertical vibrations and horizontal vibrations with a high degree of accuracy.

Embodiment 7

Figure 12:
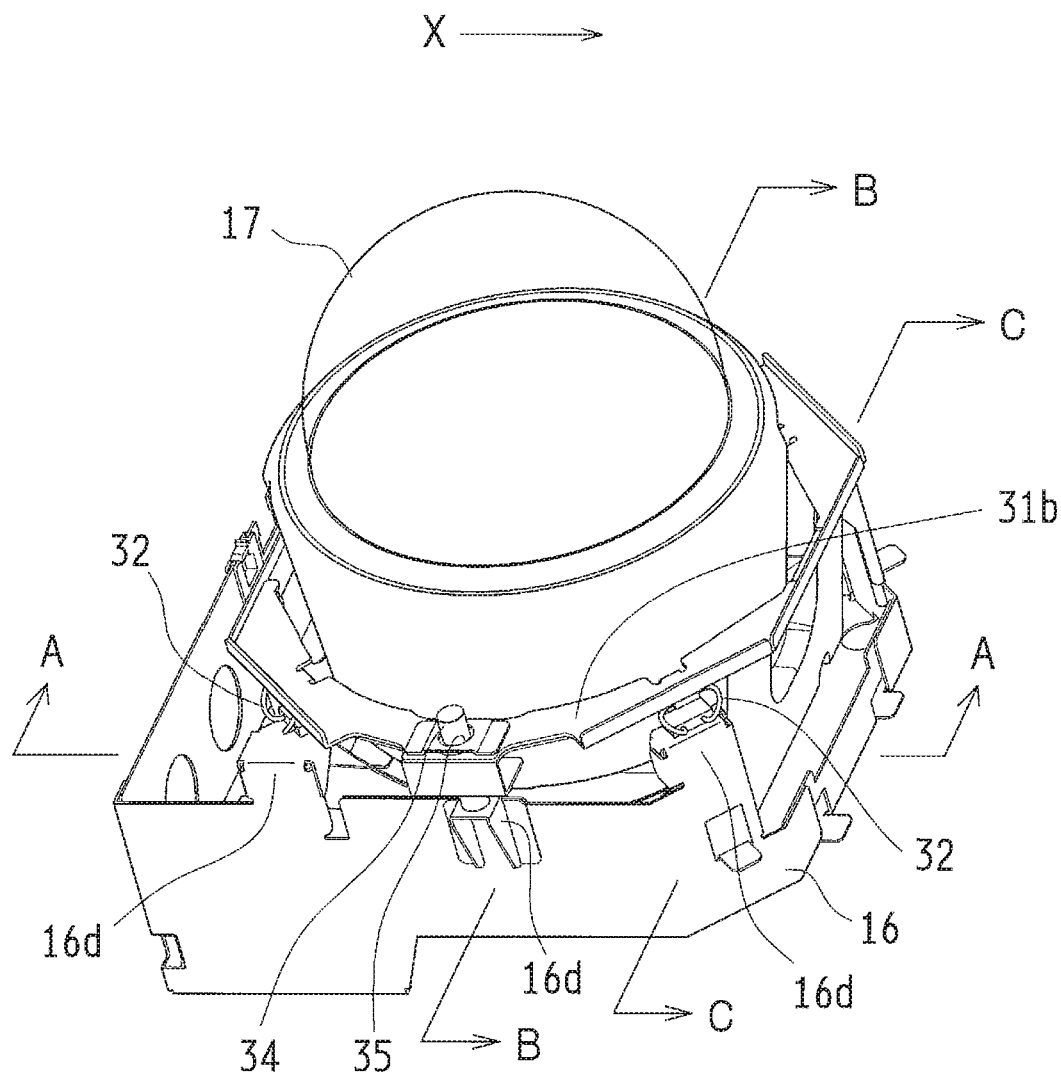
FIG. 12 is a perspective view showing a state where a monitoring device is mounted on a lifting and lowering stage with use of a vibration isolation device according to Embodiment 7.
Figure 13:
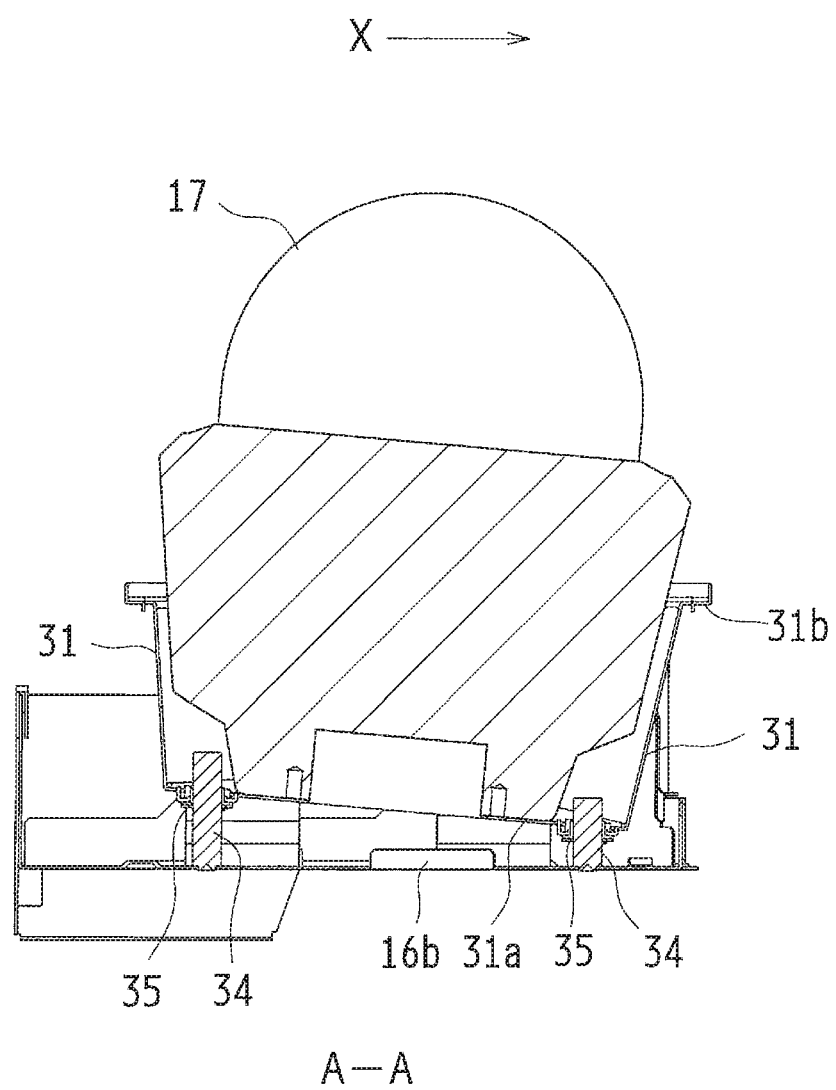
FIG. 13 is a cross-sectional view taken along line A-A in FIG. 12.
Figure 14:
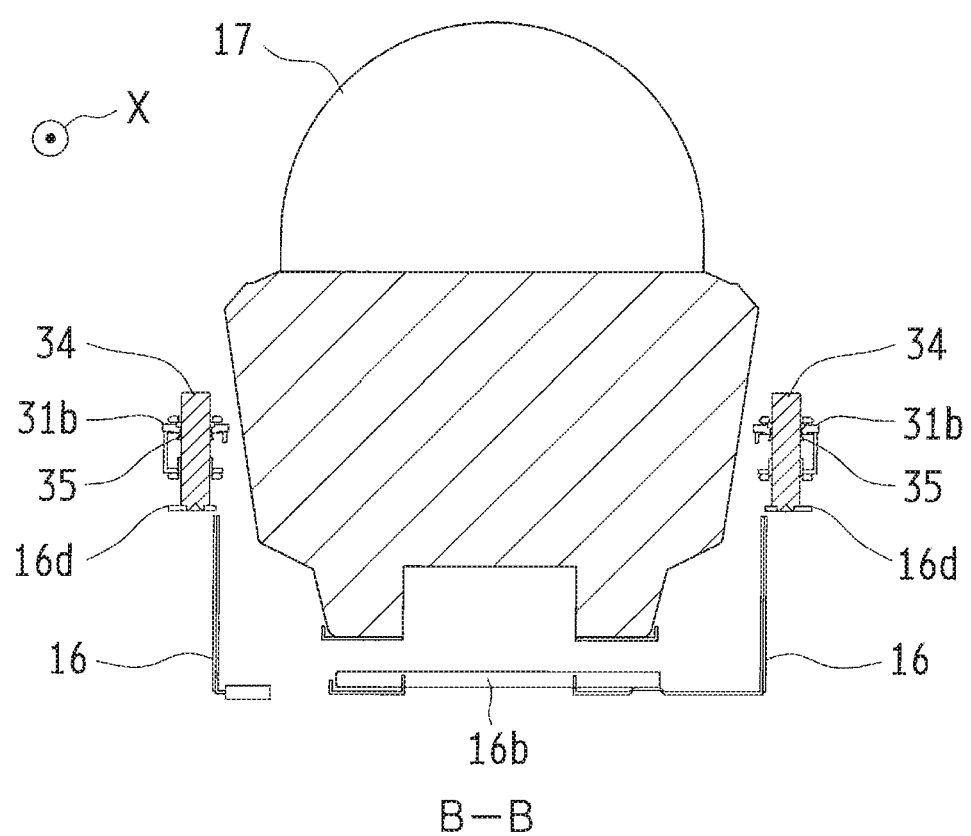
FIG. 14 is a cross-sectional view taken along line B-B in FIG. 12.
Figure 15:
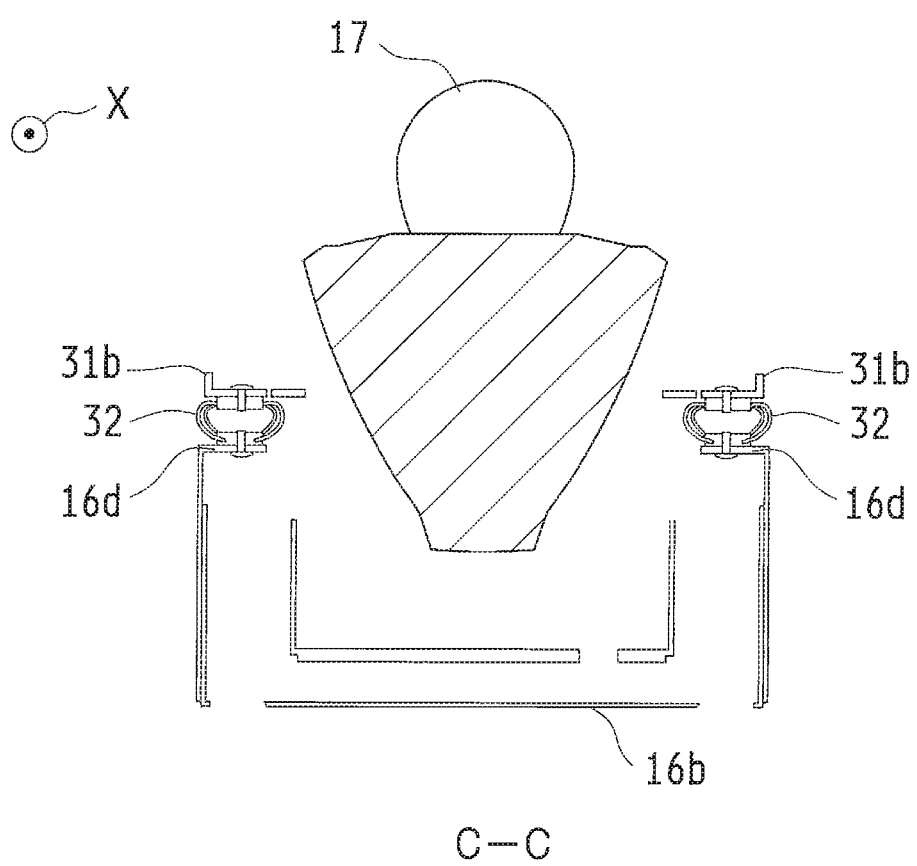
FIG. 15 is a cross-sectional view taken along line C-C in FIG. 12.

FIG. 12 is a perspective view showing a state where a monitoring device is mounted on a lifting and lowering stage with use of a vibration isolation device according to Embodiment 7. The present embodiment is a modification of Embodiment 2 shown in FIG. 6. FIG. 13 is a cross-sectional view taken along line A-A in FIG. 12. FIG. 14 is a cross-sectional view taken along line B-B in FIG. 12. FIG. 15 is a cross-sectional view taken along line C-C in FIG. 12. Note, however, that the cross-sectional view shown in FIG. 13 is a cross-sectional view taken along the direction of travel X of the moving body 1 and the cross-sectional views shown in FIGS. 14 and 15 differ by 90 degrees from the direction of travel X of the moving body 1.

As shown in FIGS. 12 to 15, the present embodiment is configured such that contact and fixing positions between the supporting plate 31 and upper sides of the elastic members 32 are higher positions than the bottom face of the monitoring device 17. Specifically, a recess 16b is formed by denting a mounting surface of the lifting and lowering stage 16 into a rectangular shape, and a recess 31a is formed by denting, into a rectangular shape, a part of the supporting plate 31, opposed to the lifting and lowering stage 16, on which the monitoring device 17 is mounted.

Embodiment 7 too is configured such that the monitoring device 17 is disposed at a downward tilt toward the front (in FIGS. 12 and 13, the right) along the direction of travel X of the moving body 1. That is, a bottom face of the recess 31a of the supporting plate 31 on which the monitoring device 17 has been fixedly mounted is disposed at a downward tilt toward the front (in the direction of travel X) with respect to the mounting surface of the lifting and lowering stage 16. The angle of tilt θ is for example approximately 5 degrees.

The supporting plate 31 has a flanged part 31b formed substantially horizontally at an upper end thereof so as to surround the recess 31a, and the recess 31a has a bottom face tilted with respect to the flanged part 31b. Further, the lifting and lowering stage 16 has a step 16d provided therearound so as to project upward in conformance with the flanged part 31b, and a lower surface of the flanged part 31b and an upper surface of the step 16d are opposed to each other.

In the example shown in FIGS. 12 to 15, the elastic members 32 are disposed on the step 16d so as to be in four places at the front, at the back, on the right, and on the left, respectively, of the monitoring device 17, and the step 16d and the flanged part 31b are fixed to each other via the elastic members 32.

By thus providing the lifting and lowering stage 16 with the recess 16b and the step 16d and providing the supporting plate 31 with the flanged part 31b, the distance between the step 16d and the flanged part 31b in each place can be held constant even when the bottom face of the recess 31a is tilted toward the front, so that uniform elasticity holding power can be attained by using common parts as the elastic members 32.

Further, since the elastic members 32 are disposed in positions at the center of gravity of the monitoring device 17 or nearby positions so as to be in four places at the front, at the back, on the right, and on the left, respectively, of the monitoring device 17, longitudinal and horizontal vibrations, i.e. the longitudinal and horizontal wobbling (i.e. movement) of the monitoring device 17 due to the force of inertia that is received during acceleration, deceleration, or the like of the moving body 1 can be reduced. This makes it possible to bring about greater vibration isolating effects.

Further, as shown in FIGS. 12 to 15, two regulating pins 34 are provided on the step 16d so as to be located on the right and left, respectively, of a lateral face of the monitoring device 17 in the direction of travel X of the moving body 1, and are loosely fitted in loose-fit holes 35 provided at corresponding positions in the flanged part 31b. Furthermore, two regulating pins 34 are provided in the recess 16b of the lifting and lowering stage 16 so as to be at the front and back, respectively, of the bottom face of the monitoring device 17 along the direction of travel X of the moving body 1, and are loosely fitted in loose-fit holes 35 provided in the recess 31a of the supporting plate 31. The back regulating pin 34 is longer than the front regulating pin 34, as the supporting plate 31 is disposed at a tilt.

As illustrated, a total of four regulating members 33 are provided so that two of them are on the right and left, respectively, in high positions facing the lateral face of the monitoring device 17 and the other two are at the front and back, respectively, in low positions facing the bottom face of the monitoring device 17, and the regulating pins 34 are fixed in different positions with respect to the height direction of the monitoring device 17. This constitutes a three-point support in a horizontal direction and a height direction in both front-back and right-left directions as seen from the center of gravity of the monitoring device 17, making it possible to bring about great vibration isolating effects.

Since two regulating pins 34 are fixed to the lifting and lowering stage 16 in different positions with respect to the height direction of the monitoring device 17, great vibration isolating effects can be brought about by better inhibiting a tilt than regulation at the same height position and isolating front-back and right-left vibrations with the regulating members. Further, even in the event of horizontal swinging (including not only the force of inertia during acceleration or deceleration of the moving body but also the shock load of an unexpected collision or the like), the monitoring device 17 can be prevented from rotating or tilting.

The positions in which regulating members 34 are fixed are not limited to any particular places, provided they are at least two places around the monitoring device 17 that differ in position from each other with respect to a height direction. However, it is preferable that the regulating members 34 be provided to face the bottom face and the lateral face. In particular, by providing regulating members 34 at the front and back, respectively, of the bottom face of the monitoring device 17 along the direction of travel of the moving body 1, a rotational displacement of the monitoring device 17 in a front-back direction due to the force of inertia that is received during acceleration, deceleration, or the like of the moving body 1 can be prevented, so that more stable great vibration isolating effects can be brought about. Further, by fixing regulating members 34 on the right and left, respectively, of the lateral face of the monitoring device 17, a rotational displacement of the monitoring device 17 in a right-left direction can be prevented, so that more stable great vibration isolating effects can be brought about.

Embodiment 8

Figure 16:
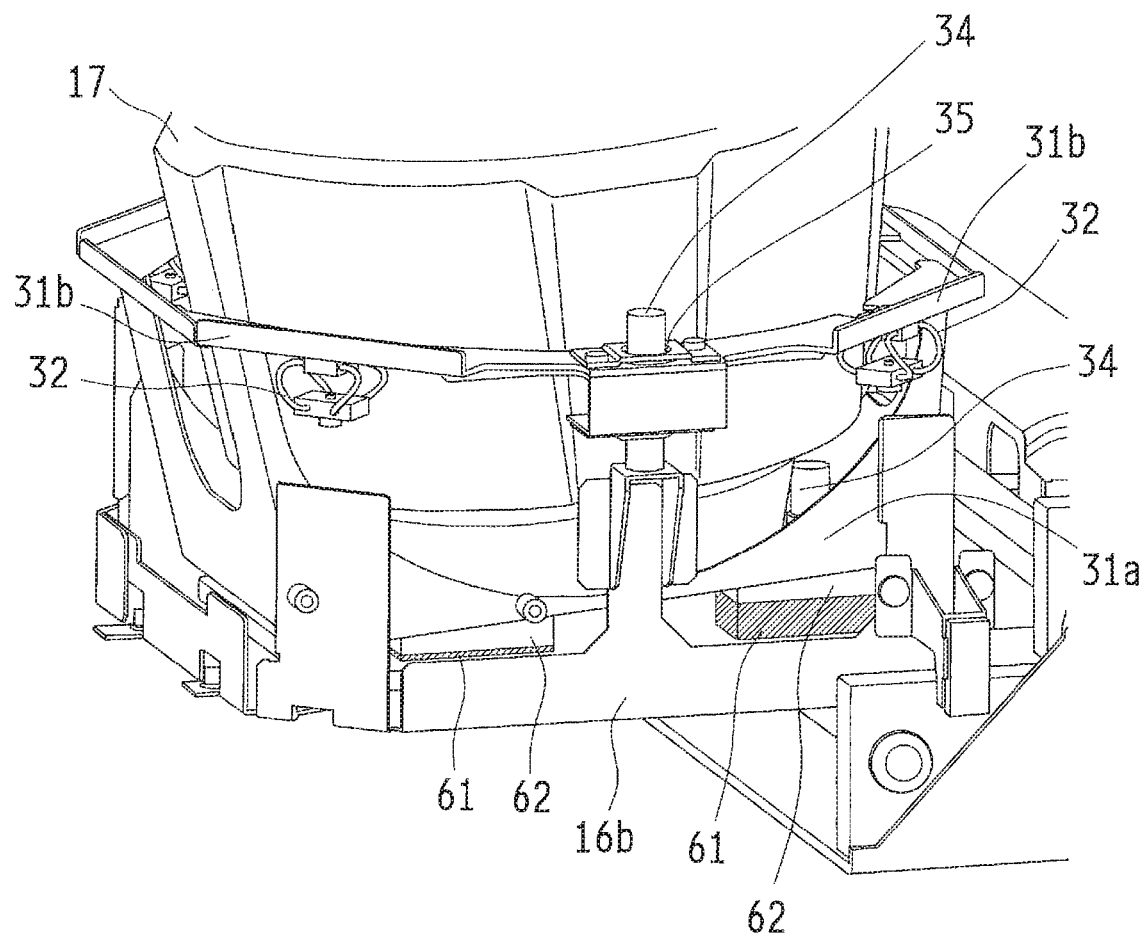
FIG. 16 is an exploded perspective view showing a state where a monitoring device is mounted on a lifting and lowering stage with use of a vibration isolation device according to Embodiment 8.

FIG. 16 is an exploded perspective view showing a state where a monitoring device is mounted on a lifting and lowering stage with use of a vibration isolation device according to Embodiment 8. The present embodiment is a modification of Embodiment 7 shown in FIGS. 12 to 15. Embodiment 8 differs from Embodiment 7 in that a pedestal 61 and a shock-absorbing sheet 62 are interposed between the recess 16b of the lifting and lowering stage 16 and the recess 31a of the supporting plate 31. The present embodiment too is configured such that the bottom surface of the recess 31a of the supporting plate 31 on which the monitoring device 17 has been fixedly mounted is disposed at a downward tilt toward the front (in the direction of travel X) with respect to the mounting surface of the lifting and lowering stage 16.

The pedestal 61 is a member having a lower surface fixed to the recess 16*b* of the lifting and lowering stage 16 and an upper surface on which the shock-absorbing sheet 62 is mounted, and is constituted, for example, by a member such as rubber. Further, a plurality of the pedestals 61 are provided below the monitoring device 17 or, preferably, provided at the front, at the back, on the right, and on the left in the direction of travel X of the moving body 1. As shown in FIG. 16, the bottom face of the recess 31*a* is tilted in the direction of travel X of the moving body 1, the pedestals 61 provided at the front and back differ in height from each other so that their respective upper surfaces are at substantially the same distance from the bottom face of the recess 31*a*.

The shock-absorbing sheet 62 is a member mounted on the pedestal 61 and held in contact with the bottom face of the recess 31*a*, and is constituted, for example, by a material such as gel. Since, as mentioned above, the pedestals 61 provided at the front and back differ in height from each other so that their respective upper surfaces are at substantially the same distance from the bottom face of the recess 31*a*, the shock-absorbing sheet 62 is a common part in each place.

In the present embodiment, by being interposed between the lifting and lowering stage 16 and the supporting plate 31, a combination of the pedestal 61 and the shock-absorbing sheet 62 functions as an additional elastic member to make it possible to absorb and thereby reduce vibrations of the supporting plate 31 on which the monitoring device 17 has been mounted.

It should be noted the embodiments disclosed herein are examples in all respects and should not constitute grounds for limited interpretation. Therefore, the technical scope of the present invention is not interpreted solely by the embodiments described above but defined on the basis of the descriptions in the scope of the claims. Further, all changes falling within the meaning and scope equivalent to the scope of the claims are encompassed.

REFERENCE SIGNS LIST

1 Moving body
11 Lifting and lowering device
13 Lower base
14 Lower supporting member
15 Upper supporting member
16 Lifting and lowering stage (lower plate)
16*a* Mounting surface
16*b* Recess
16*d* Step
16*d*1 Mounting surface
16*e* Insertion hole
17 Monitoring device (electronic device)
18 Coupling plate
21 Driving section
30 Vibration isolation device
31 Supporting plate (upper plate)
31*a* Recess
31*b* Flanged part
32 Elastic member
32*a*, 32*b* Contact and fixing position
33 Regulating member
34 Regulating pin
34*a* Body part
34*b* Locking part
34*c* Male screw part
35 Loose-fit hole
40 Exterior cover
51 Metal sleeve
52 Rubber bush
52*a* Body part
52*b* Flange part
53 Reinforcing rubber bush
54, 55 Metal washer
56 Nut
57 Bearing part
58 Plate body
61 Pedestal
62 Shock-absorbing sheet
LN Link mechanism
X Direction of travel

The invention claimed is:

1. A vibration isolation device for isolating vibrations during movement of an electronic device mounted on a moving body, comprising:
    a lower plate facing the moving body and serving as a base;
    an upper plate supporting the electronic device;
    elastic members interposed between the lower plate and the upper plate and each fixed to the lower plate and the upper plate; and
    a regulating member that regulates horizontal vibrations of the electronic device, wherein
    fixing positions between the upper plate and the elastic members are at higher positions than a bottom face of the electronic device.

2. The vibration isolation device according to claim 1, wherein the regulating member includes a regulating pin provided to stand vertically on the lower plate and a loose-fit hole formed in the upper plate, and
    the loose-fit hole is loosely fitted on the regulating pin.

3. The vibration isolation device according to claim 2, wherein a plurality of the regulating pins and a plurality of the loose-fit holes are formed in a plurality of places.

4. The vibration isolation device according to claim 2, wherein the lower plate is disposed in a horizontal direction along a direction of travel of the moving body,
    the upper plate is disposed parallel to the lower plate via the elastic members, and
    the regulating pin is provided to stand perpendicularly to the lower plate.

5. The vibration isolation device according to claim 1, wherein the fixing positions between the upper plate and the elastic members are positions at a center of gravity in a height direction of the electronic device or nearby positions.

6. The vibration isolation device according to claim 1, wherein fixing positions between the lower plate and the regulating member include at least two places that differ in position from each other with respect to a height direction of the electronic device.

7. The vibration isolation device according to claim 6, wherein the fixing positions between the lower plate and the regulating member face the bottom face and a lateral face of the electronic device.

8. The vibration isolation device according to claim 1, wherein the elastic members are disposed in at least two places at a front and back of the electronic device with respect to the direction of travel of the moving body, and
    the elastic member disposed at the front is larger in load-carrying capacity than the elastic member disposed at the back.

9. The vibration isolation device according to claim 1, wherein the electronic device is a monitoring device mounted with a camera.

10. A vibration isolation device for isolating vibrations during movement of an electronic device mounted on a moving body, comprising:
- a lower plate facing the moving body and serving as a base;
- an upper plate supporting the electronic device;
- elastic members interposed between the lower plate and the upper plate and each fixed to the lower plate and the upper plate;
- a regulating member that regulates horizontal vibrations of the electronic device; and
- an exterior cover fixed to the lower plate so as to encapsulate the electronic device, wherein
the regulating member is constituted by the exterior cover and another elastic member interposed in a surrounding clearance between the exterior cover and the electronic device.

11. A vibration isolation device for isolating vibrations during movement of an electronic device mounted on a moving body, comprising:
- a lower plate facing the moving body and serving as a base;
- an upper plate supporting the electronic device;
- elastic members interposed between the lower plate and the upper plate and each fixed to the lower plate and the upper plate; and
- a regulating member that regulates horizontal vibrations of the electronic device, wherein
the electronic device is disposed together with the upper plate at a downward tilt in the direction of travel of the moving body.

* * * * *